(12) United States Patent
Nell, Jr.

(10) Patent No.: US 8,776,432 B2
(45) Date of Patent: Jul. 15, 2014

(54) INTEGRATED TRELLIS MACHINE

(76) Inventor: Charles R. Nell, Jr., Hanover, PA (US)

( * ) Notice: Subject to any disclaimer, the term of this patent is extended or adjusted under 35 U.S.C. 154(b) by 225 days.

(21) Appl. No.: 13/556,303

(22) Filed: Jul. 24, 2012

(65) Prior Publication Data

US 2014/0026482 A1    Jan. 30, 2014

(51) Int. Cl.
*A01G 31/00*    (2006.01)

(52) U.S. Cl.
USPC ........................................ 47/62 R; 47/62 C

(58) Field of Classification Search
USPC .......... 47/59 R, 62 R, 62 N, 63, 62 C, 17, 70, 47/66.6, 47
See application file for complete search history.

(56) References Cited

U.S. PATENT DOCUMENTS

| | | | | |
|---|---|---|---|---|
| 3,066,445 A | * | 12/1962 | D Amico | 47/20.1 |
| 4,662,106 A | * | 5/1987 | Mori | 47/17 |
| 4,813,176 A | * | 3/1989 | Takayasu | 47/59 R |
| 5,067,275 A | * | 11/1991 | Constance | 47/62 E |
| 2014/0041291 A1 | * | 2/2014 | Salojarvi et al. | 47/29.1 |

OTHER PUBLICATIONS

Hydrofarm—Carbon Dioxide Enrichment Methods, http://www.hydrofarm.com/articles/co2_enrichment.phh (4 pgs.), Feb. 9, 2012.
600w Dimmable Electronic Grow Light, http://www.bestgrowlights.com/product/HF600D_600-Watt-Dimmable-Phantom-Ballast,-X . . . (3 pgs.), Feb. 9, 2012.
Nutrient Film Technique, http://en.wikipedia.org/wiki/Nutrient_film_technique (2 pgs.), Feb. 9, 2012.

* cited by examiner

*Primary Examiner* — Kristen C Hayes
(74) *Attorney, Agent, or Firm* — Davis & Bujold, PLLC; Michael J. Bujold

(57) ABSTRACT

An integrated trellis machine for growing systems. The trellis machine comprises a framework which supports a shroud such that the shroud defines a growing area within the interior of the trellis machine. A nutrient delivery system supplies nutrients to vegetation as it grows within the growing area. A lighting system supplies light to the vegetation and includes a source of light which is housed within a casing. The casing is supported within the growing area and forms a conduit having ends which are open to the exterior of the growing area. A trellis is supported by the framework and located within the growing area between the nutrient delivery system and the source of light The trellis forms a barrier between the vegetation and the source of light and the trellis is shaped so as to redirect the growth of the vegetation as the vegetation grows.

14 Claims, 12 Drawing Sheets

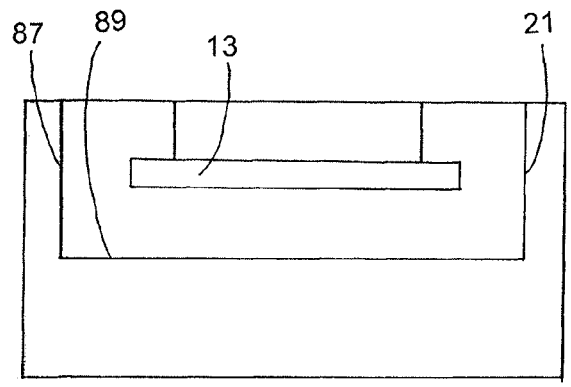
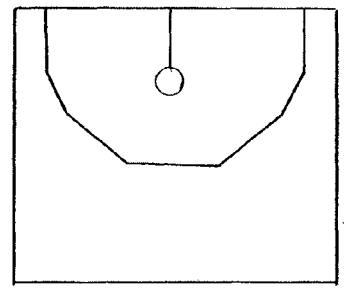
FIG. 10A  FIG. 10B
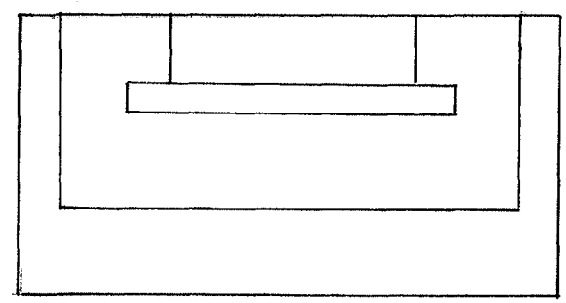
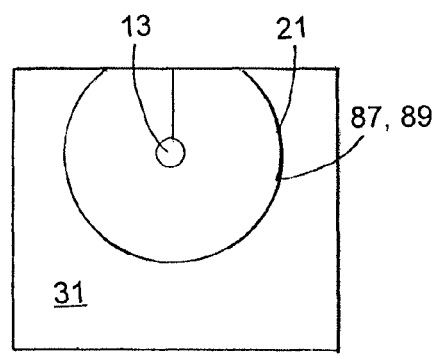
FIG. 11A  FIG. 11B
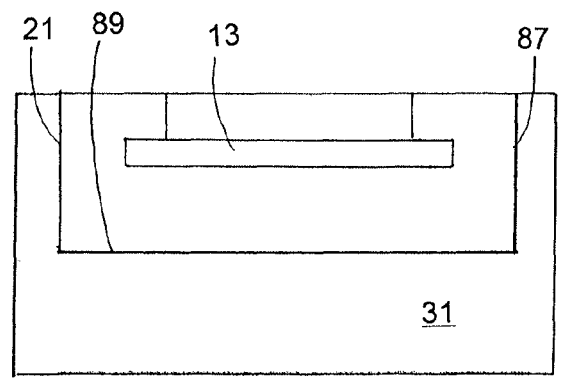
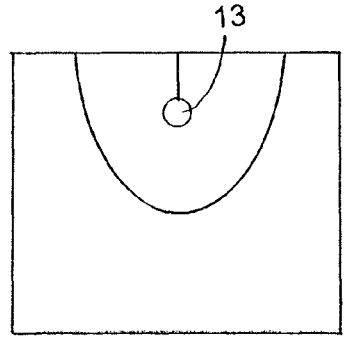
FIG. 12A  FIG. 12B

INTEGRATED TRELLIS MACHINE

FIELD OF THE INVENTION

The present invention relates to an integrated trellis machine and vegetation growing system.

BACKGROUND OF THE INVENTION

A number of systems and methods are known for growing vegetation. In the recent past there has been an increased focus on the use of hydroponic nutrient delivery systems for growing vegetation. With such hydroponic systems, vegetation is grown in water containing mineral nutrient solutions instead of the more common methods of growing vegetation in soil. There are many benefits to growing vegetation with hydroponic techniques. It is generally believed that much higher crop yields can be produced using hydroponic growing techniques and also such techniques can be used in areas where in-ground agriculture or gardening are not possible.

There are two types of hydroponic techniques that appear to be the most efficient and productive. One of these techniques is called the nutrient film technique (NFT) and includes a system which makes use of a channel that has a film of nutrient solution that runs along the bottom of the channel. This channel houses the roots of the plant with the roots of the plant sitting down into the thin film of nutrient as it flows down through the channel. In this manner the roots receive ample food and oxygen from the system.

As is typical with the systems in the hydroponics industry which employ the NFT, the channels and therefore the plants are arranged on a flat plane that is located below a central source of light. The light that is emitted from the central source, cascades down upon the plants located within the channel which in turn grow upward in the direction of the source of light. In the known systems, the lumens of the light from the central source decrease as they progress in a cone shape towards the plants and the further out that the light radiates from the bulb/bulbs the weaker the intensity of the light becomes. The problem has always existed that the plants located further away from the central source of light receive less light in comparison to the plants located in the center of the grow chamber. This typically results in an uneven grow pattern and a reduction in the efficiency of the system, i.e. the plants located closer to the light source grow faster than the plants that are located further away from the light source. As a result, the plants that are located closer to the light source become taller and tend to block the light from the smaller plants that are located further away from the light source.

SUMMARY OF THE INVENTION

Wherefore, it is an object of the present invention to overcome the above mentioned shortcomings and drawbacks associated with the prior art. The trellis of the inventive integrated trellis machine snaps into place inside of the machine and "shapes" the foliage of the plant to meet the needs of the lighting system instead of the light being required to meet the needs of the plant. With the inventive trellis machine, as the plant grows, it curves up and around the bulb and is thereby perfectly bathed in the light of the bulb during all phases of operations when the light is on. This maximizes efficiency as well as production.

In addition to the NFT system described above, the inventive integrated trellis machine is convertible for use with other types of hydroponic systems. For example, the integrated trellis machine can be used with a Deep Water Culture (DWC) system which, instead of channels, has buckets of solution that sit in the bottom of the machine. With the DWC system, the roots of the plants dangle into the solution within the buckets. In addition an air pump blows air into the nutrient solution to insure that an ample amount of oxygen is supplied to the roots of the plant. Without air being injected into the nutrient solution, the plants would drown. In a manner similar to the above, the trellis is situated between the plants and the source of light such that as the plants grow toward the light, they come into contact with the trellis. The trellis forms an impedance for the natural growth of the plant directly toward the source of light. Contact with the integrated trellis causes the growth of the plant to be redirected. The integrated trellis is shaped so as to meet the needs of the light.

The integrated trellis machine of the present invention is also convertible depending on the different types of plants to be grown in the hydroponic system. The integrated trellis machine can be modified so as to accommodate vegetation such as lettuce where the shape of the plant would not make it suitable for the integrated trellis. If desired, the integrated trellis can be removed from the integrated trellis machine and the plants can be grown on a flat plane. Every element of the integrated trellis machine is infinitely adjustable and can be controlled to meet the needs of each specific plant as it grows in the trellis machine for every stage of the plants development. The lumens of the lamp are adjustable as well as the spectrum of light. The air composition is adjustable and employs the use of $CO_2$ to enhance the growth and performance of the plants. The nutrient solution is adjustable to meet the needs of any specific plant that is placed into the machine and trained to the trellis. The air charge is evacuated after a "lights on" cycle and a new air charge is pulled in. The duration of time that the light is on is set by way of timers and is infinitely controllable. All of these functions are accomplished by way of timers that automatically control all phases of operations. The integrated trellis machine is totally automated and the only facets of the operation that need to be monitored are the PH of the nutrient solution and training of the plant to the trellis.

The present invention also relates to an integrated trellis machine for hydroponic growing systems. The trellis machine comprises a framework having a plurality of frame members. A shroud is supported by the framework to define a growing area that is located within the interior of the trellis machine. A hydroponic nutrient delivery system which supplies nutrients to vegetation as the vegetation grows within the growing area. A lighting system supplies light to the vegetation as the vegetation grows, the lighting system includes a source of light which is housed within a casing. The casing is supported within the growing area and forms a conduit having ends which are open to the exterior of the growing area. A trellis is supported by the framework and located within the growing area between the nutrient delivery system and the source of light The trellis forms a barrier between the vegetation and the source of light and the trellis is shaped so as to redirect the growth of the vegetation as the vegetation grows.

The present invention also relates to an integrated trellis machine for hydroponic growing systems, the trellis machine comprises a housing comprising a framework and a shroud that is supported over the framework and defines a growing area located within an interior of the trellis machine. A hydroponic nutrient delivery system that supplies nutrients to vegetation as the vegetation grows within the growing area. A lighting system that supplies light to the vegetation as the vegetation grows, the lighting system comprising a source of light which is housed within a light casing which is supported within the growing area. The light casing forms a vertically aligned conduit and has an upper end and a lower end which are open to an exterior of the growing area. A trellis that is supported by the light casing and located within the growing area between the housing and the source of light such that the trellis forms a barrier between the vegetation and the source of light, the trellis being shaped to redirect growth of the vegetation as the vegetation grows.

BRIEF DESCRIPTION OF THE DRAWINGS

The invention will now be described, by way of example, with reference to the accompanying drawings in which:

FIGS. 10A, 10B are diagrammatic views of one embodiment of a trellis in the integrated trellis machine;

FIGS. 11A, 11B are diagrammatic views of another embodiment of the trellis in the integrated trellis machine;

FIGS. 12A, 12B are diagrammatic views of a further embodiment of the trellis in the integrated trellis machine;

DETAILED DESCRIPTION OF THE INVENTION

Figure 1:
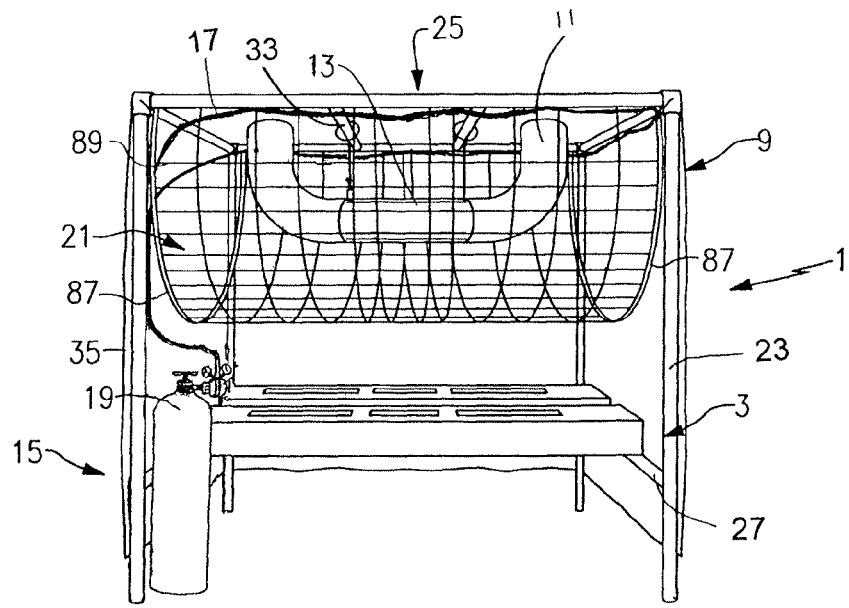
FIG. 1 is a pictorial front view of the integrated trellis machine with the integrated trellis.

Turning now to the figures, a brief description concerning the various components of the present invention will now be briefly discussed. As can be seen in this embodiment shown in FIG. 1, the vegetation growing system 1 includes a hydroponic nutrient delivery system 3 having two NFT rails 5 which support the individual plants and through which the plants are supplied with the solution 7 of nutrients and water. Adjacent the top of the vegetation growing system 1 is the hydroponic lighting system 9 which includes a cooling conduit 11. The light source 13 is supported within the cooling conduit 11 and situated generally over the two rails 5. The vegetation growing system 1 further includes hydroponic $CO_2$ enrichment system 15 having a conduit 17 connected to a gas tank 19 which delivers $CO_2$ gas to the plants. Attached to the top of the vegetation growing system 1 is an integrated trellis 21, the use of which will be discussed hereinafter.

The above mentioned components of the vegetation growing system 1 are supported by a framework having four vertical posts 23 and top and bottom rectangular frames 25, 27. The corners of the top and bottom frames 25, 27 are supported by the posts 23 in such a manner that the top and bottom frames 25, 27 are essentially horizontally aligned with respect to the surface on which the vegetation growing system 1 is located. The top frame 25 is adjustably fixed at the top of the vertically standing posts 23 while the bottom frame 27 is adjustably fixed to four posts 23 at a distance beneath the top frame 25. Together the top and bottom frames 25, 27 and the four vertical posts 23 form an adjustable frame body 29 and define the enclosure or the growing area 31 in which the plants will be located as they grow. It should be noted that additional frame members 33 may be coupled to the frame body 29 to support the other elements of the vegetation growing system 1 as will be discussed below. In one preferred embodiment, the framework is aluminum which is known to be strong and lightweight while at the same time aluminum does not conduct heat. Such a framework enables easy transportation or movement of the vegetation growing system 1.

The frame body 29 is covered by a shroud material 35 which encloses the growing area 31 and insulates it from the environment in which the vegetation growing system 1 is located. The shroud material 35 is at least secured about the top frame 25 such that the shroud 35 covers the top frame 25 and hangs therefrom to form the side walls 37 of the enclosure. Adjacent side walls 37 can be formed from a single continuous piece of shroud material 35 or the side walls 37 can be independent from each other. In this case, adjacent side walls 37 can be joined together by typical fasteners such as zippers, buttons, and hook and loop fasteners for example. The side walls 37 can additionally be secured to the vertical posts 23 of the frame body 29 however it is preferred if at least one of the sides of the enclosure is not secured to the vertical posts 23. This would enable the shroud material 35 of the associated side wall 37 to be drawn back thereby facilitating easy access to the growing area 31 without the need to completely open the growing area 31 to the environment. It is to be understood that in this manner the shroud 35 allows access to all four sides of the growing area 31 thus enabling inspection, pruning, training, etc., while maintaining a "light tight" environment.

The bottom frame 27 of the frame body 29 can be enclosed with the shroud material 35 however it should be appreciated that some of the elements of the vegetation growing system 1, e.g. nutrient supply lines, return drains and a nutrient reservoir are located at the bottom or beneath the enclosure. As the shroud material 35 generally acts to insulate the growing area 31 from the environment in which the vegetation growing system 1 is located, i.e. retain the heat within the growing area, it is preferable to enclose only portions of the bottom of the enclosure. In this manner the heat that is produced by the light source 13 is substantially retained within the growing area 31. Enclosing the frame body 29 with shroud material 35 enables the grower to maintain the temperature of the growing area 31 in a consistent and controllable manner. In addition, enclosing the frame body 29 helps to maintain the levels of $CO_2$ in the growing area 31 as will be explain below.

In one advantageous form, the shroud material 35 is a heavy canvas that is lined with a reflective Mylar finish that reflects up to 93% of the light. With such a reflective coating, light that might not otherwise be absorbed by the plants and therefore not be useful is reflected back toward the plants located within the growing area 31. The reflective coating on the shroud material 35 thereby helps to eliminate "illumination hot spots" on the surfaces of the plants as well as to increase the efficiency of the light energy emitted by the light source 13. It is to be understood that the degree of the light reflectivity of the shroud material directly correlates to the energy efficiency of the vegetation growing system 1.

As can be seen in the FIGS. 1 and 3 the bottom frame 27 supports the hydroponic nutrient delivery system 3 which will now be discussed with reference to FIGS. 1-3. Although the nutrient delivery system 3 is illustrated as an NFT system, it is to be appreciated that any number of different types of hydroponic systems could be used with the vegetation growing system 1 including the DWC system mentioned above, wick systems, water culture systems, ebb & flow systems and drip systems for example. The illustrated NFT system includes two rails 5 that extend right to left in FIG. 1. The rails 5, which form the flow channels 39, are supported on the bottom frame 27 with one end 41 being higher than the other end 43 such that the nutrient solution 7 supplied to the high end 41 of the rails 5 to the low end 43 of the rails 5 flows, due to gravity. The upper surface 45 of the rails 5 have cutouts 47 in which the plants will be supported such that the root mass of the plants will communicate with the nutrient solution 7.

A nutrient reservoir 49 is located below the lower end 43 of the rails 5 and contains a supply of nutrient solution 7. A nutrient pump 51 is arranged within the reservoir 49 and pumps the nutrient solution 7 from the reservoir 49 through a supply pipe 53 to a distribution manifold 55 which is located at the high end 41 of the rails 5. One or more nutrient supply lines 57 transfer the nutrient solution 7 from the distribution manifold 55 to the interior of the rails 5 at their high end 41. For the sake of clarity, a number of elements of the nutrient delivery system 3, including the supply lines 57 for example, are not illustrated in FIGS. 1 and 2. As indicated above, the nutrient solution 7 flows downhill supplying the root masses of the plants supported within the cutouts 47 with the nutrients of the nutrient solution 7. The flow of nutrient solution 7 within the nutrient delivery system 3 is indicated within the figures by arrows 59. The nutrient solution 7 flows to the low end 43 of the rails 5 where is drains, via return drains 61, to the interior of the nutrient reservoir 49.

As the nutrients in the nutrient solution 7 are depleted, more nutrients can be added to the nutrient solution 7 via a reservoir access door 63 located at the top of the reservoir 49. It is to be appreciated that the term nutrients as broadly recited herein is meant to include any substances that would be beneficial in the cultivation of vegetation such as mineral elements and/or fertilizers. It is known to growers that nutrient solutions may differ depending on the particular needs of the vegetation being grown. As developing the proper combination of nutrients and ratios of nutrients, given the type(s) of vegetation being grown, is an art in and of itself and differs from grower to grower, the same will not be further described herein.

It is also to be recognized that the nutrient reservoir 49 may include a means for aerating the nutrient solution 7 so as to supply the root masses with proper amounts of oxygen. Aerating the nutrient solution 7 may be accomplished with an air pump 65 located outside of the nutrient reservoir 49 which pumps air through a conduit 67 to an air stone 69 for example which in turn bubbles the air through the nutrient solution 7.

It is also recognized that the air and/or the nutrient pumps 69, 51 can be operated automatically depending such things as the slope of the rails 5 or in other words the flow rate of the nutrient solution 7 past the root masses and desired supply of nutrients to the vegetation.

In a preferred design of the NFT system, the channels 39 preferably have a slope of approximately between 1:30 to 1:60 and more preferably the channels 39 have a slope of approximately 1:48 which translates into a slope of 1 inch per 4 feet of channel. These slopes have been found to allow for minor irregularities in the channel surface. The flow rates of the nutrient solution 7 are preferably about 1.0 L/min however it has been found that the flow rates can be varied and can be as high as 2 L/min. The flow rate of the nutrient solution 7 is most preferably about 1 qt/min. The length of the channels 39 is preferably between 10 to 15 meters and most preferably the channels 39 have a length of approximately 12 meters. The delivery system 3 is sealed so as to prevent algae buildup within the system 3.

Figure 4:
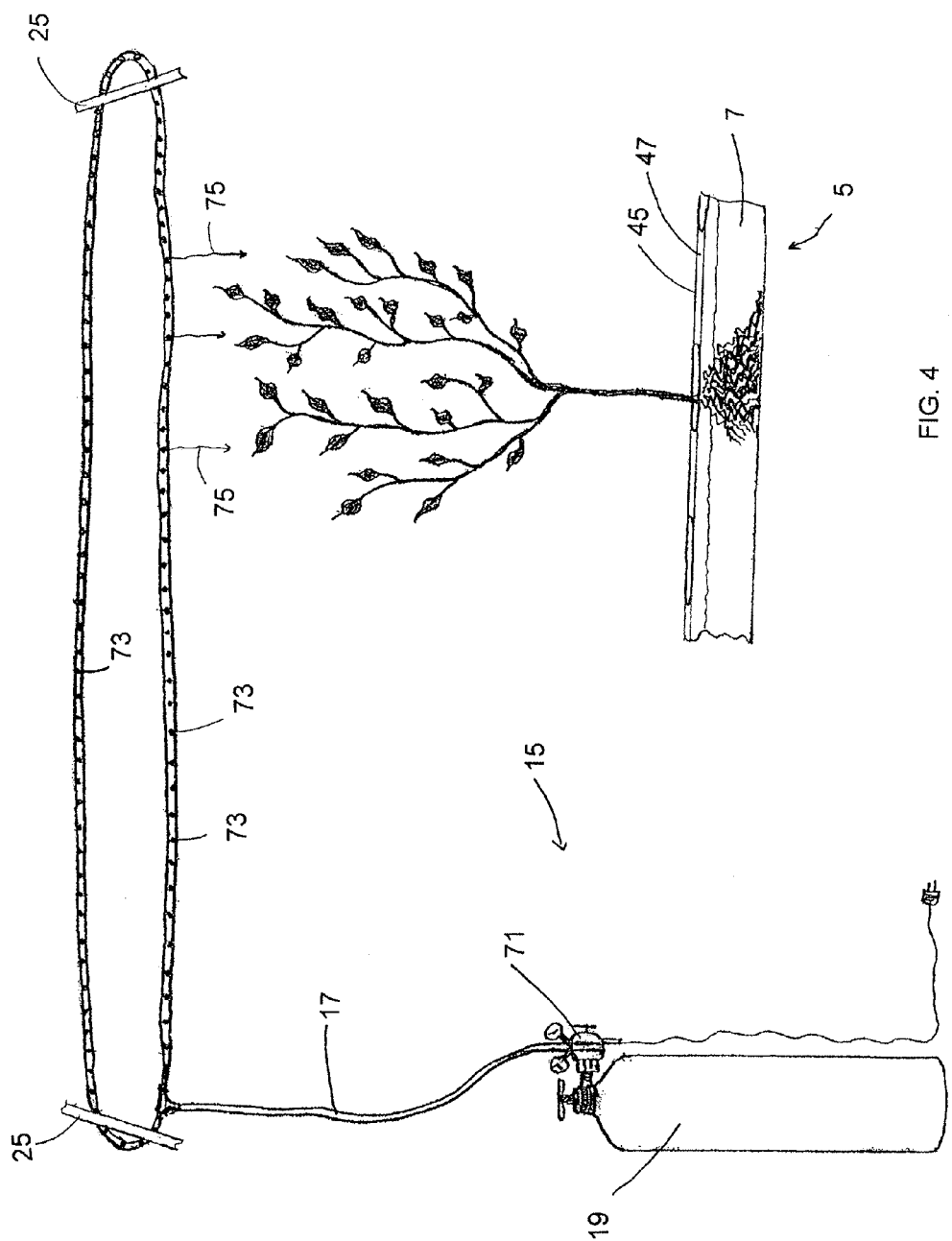
FIG. 4 is a pictorial diagram of a hydroponic $CO_2$ enrichment system of the vegetation growing system according to the invention.

Growers have long recognized the benefits of higher concentrations of $CO_2$ in the air for vegetation growth. Vegetation growing in enclosed areas such as greenhouses and vegetation growing systems as described herein often deplete the amount of $CO_2$ in the air within the enclosed area. To counter low levels of $CO_2$ in the enclosed area, the vegetation growing system 1 comprises a $CO_2$ enrichment system 15. As shown in FIG. 4 the $CO_2$ enrichment system 15 includes a tank 19 of compressed $CO_2$, a pressure regulator 71 and delivery tubing 17. The delivery tubing 17 extends from one end, which is coupled to the pressure regulator 71, upwardly to the top frame 25 where it is fixed. Although not necessary it is beneficial for the delivery tubing 17 to be arranged above the vegetation since $CO_2$ is heavier than air. As such, the delivery tubing 17 is fixed to the top frame 25 so as to be located above and at least substantially encircling the growing area 31. The flow of $CO_2$ from the delivery tubing 17 over the vegetation is illustrated in FIG. 4 as arrows 75. The length of delivery tubing 17 which encircles the growing area 31 includes a number of perforations 73 such that when the regulator 71 is actuated, $CO_2$ flows from the tank 19 through the delivery tubing 17 and out through the perforations 73. In this manner, precise amounts of $CO_2$ can be added to the air within the growing area 31. In a preferred embodiment the delivery tubing 17 is perforated vinyl tubing, however other types of flexible tubing have been found effective in delivering $CO_2$ to the interior of the vegetation growing system 1.

The $CO_2$ enrichment system 15 can be actuated automatically for example by a timer which controls the time of day and length of time that the pressure regulator 71 is actuated. The lengths of time that $CO_2$ delivery is turned on and the times of the day at which $CO_2$ delivery is initiated can depend on a number of factors. These factors may include the size of the growing area, the times during which the light source 13 is turned on and even the size or maturity of the vegetation. For example, if the vegetation is well developed, i.e. the vegetation has large or a greater number of leaves, then the delivery of $CO_2$ would necessarily need to be greater than if the vegetation was just sprouting. Also, it should be recognized that vegetation only uses $CO_2$ when exposed to light and as such the timer only needs to be set to deliver $CO_2$ when the light source 13 is turned on.

In a preferred embodiment, the $CO_2$ enrichment system 15 includes a cylinder 19 containing between 20 to 40 lbs of $CO_2$ which has been compressed to a pressure within a range of between 1,600 to 2,200 PSI.

Figure 5:
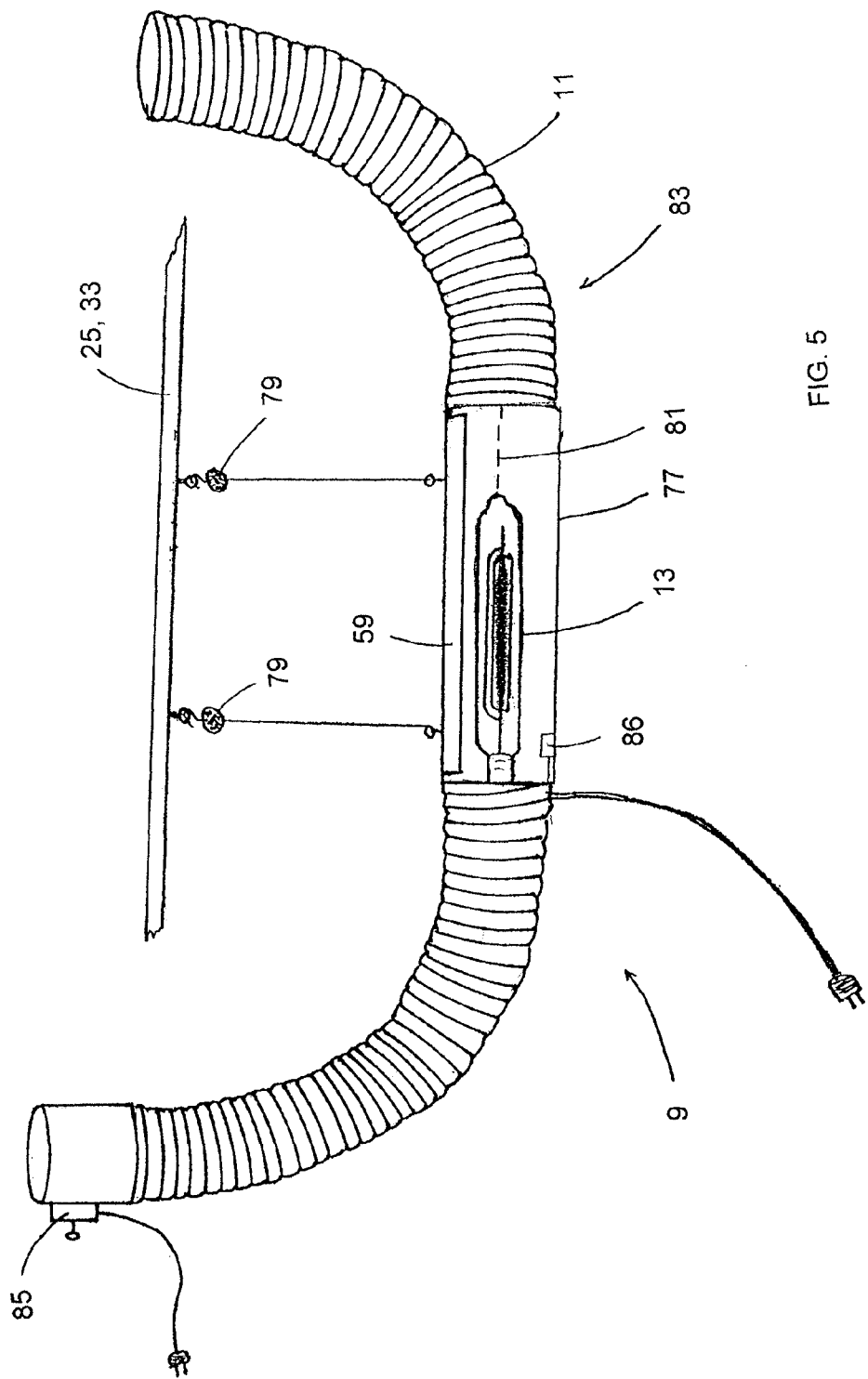
FIG. 5 is a pictorial diagram of a hydroponic lighting system of the vegetation growing system according to the invention.

The hydroponic lighting system 9 of the vegetation growing system 1 as shown in FIG. 5 comprises a source of light 13 housed within a glass bulb casing 77 which is sometimes referred to as a "cool tube". The bulb casing 77 is a cylindrical housing that is suspended from the top frame 25 by a pair of hangers 79 so as to be located generally above the vegetation growing in the nutrient delivery system 3. The hangers 79 are adjustable such that the distance between the source of light 13 and the nutrient delivery system 3 can be adjusted. That is, the source of light 13 can be easily lowered or elevated as desired with respect to the height of the vegetation such that the spacing between the source of light 13 and the vegetation can be maintained as the vegetation grows. For example, when used with seedlings, the light source 13 can be hung directly over the seedlings and spaced therefrom by a distance of approximately 2-4 inches. As the vegetation grows, the source of light 13 can be moved upward such that the distance between the light source 13 and the vegetation can be maintained as desired.

The source of light 13 is supported centrally within the cylindrical bulb casing 77 so as to extend along the axis 81 of the bulb casing 77. Locating the source of light 13 within the bulb casing 77 in this manner facilitates cooling of the source of light 13 as described below. Two sections of flexible cooling conduit 11 are attached to respective axial ends of the bulb casing 77. In the embodiment shown in FIG. 5 the diameter of the cooling conduit 11 is approximately the same as diameter the bulb casing 77 such that the assembly of the two sections of cooling conduit 11 and the bulb casing 77 form a duct 83. One end of the duct 83, i.e. an end of a first section of the cooling conduit 11 that is remote from the bulb casing 77 is secured to the shroud material 35 such that the end of the duct 83 is open to the outside atmosphere. The other end of the duct 83, i.e. the end of a second section of the cooling conduit 11 that is remote from the bulb casing 77 is secured to the shroud material 35 such that the other end of the duct 83 is also open to the outside atmosphere. One of the ends of the cooling conduit 11 sections comprises a blower 85, fan or other type of air mover which is controlled to draw air thought the duct 83. In this manner, air from outside the enclosure is used to cool the source of light 13 retained within the bulb casing 77. It is to be appreciated that both the source of light 13 and the blower 85, fan or other type of air mover may by electrically controlled so as to turn on and off at certain intervals. Further, sensors 86 may be used to determine the temperature of the source of light 13 such that when the source of light 13 approaches undesirably high temperatures the blower 85, fan or other type of air mover can be automatically turned on. In this manner the source of light 13 can be cooled automatically according to the recommended operating temperatures of the specific source of light. The bulb casing 77 can further comprise a reflector 59, which is used to direct lumens from the source of light 13 in a desired direction, i.e. towards the vegetation.

In a preferred embodiment, the lighting system 9 comprises a 600 Watt dimmable Phantom MH Grow Light Package which includes a 600 Watt Dimmable Phantom Ballast, Xtrasun II Reflector and 1000 w Plantmax MH Conversion Bulb. Another preferred embodiment of the lighting system 9 comprises a 600 Watt HPS (High Pressure Sodium) plant grow light, which has been found to be effective for fruiting/flowering vegetation, 600 w HPS XtraSun Ballast, a 6 inch Cool Tube Reflector and a PlantMax 600 w HPS Bulb As illustrated in FIGS. 1, 2, the vegetation growing system 1 comprises a trellis 21 which is used to train vegetation in a manner described below. The trellis 21 comprises two braces 87 and a mesh barrier 89 that is connected therebetween. In the embodiment shown in FIGS. 1, 2, the braces 87 are secured at opposite sides of the enclosure and form a U-shape when viewed from the sides of the trellis 21. The trellis 21 hangs from the upper frame 25 and extends downward so as to be between the hydroponic lighting system 9 and the nutrient delivery system 3 thereby dividing the growing area 31 into different portions. That is to say that the trellis 21 hangs from the top of the enclosure and defines an inner area and an outer area. The inner area is the portion of the growing area 31 that is located inside the U-shaped trellis and in which the hydroponic lighting system 9 is located. The outer area is the portion of the growing area 31 located outside the U-shaped trellis and in which the nutrient delivery system 3 is located.

Figure 2:
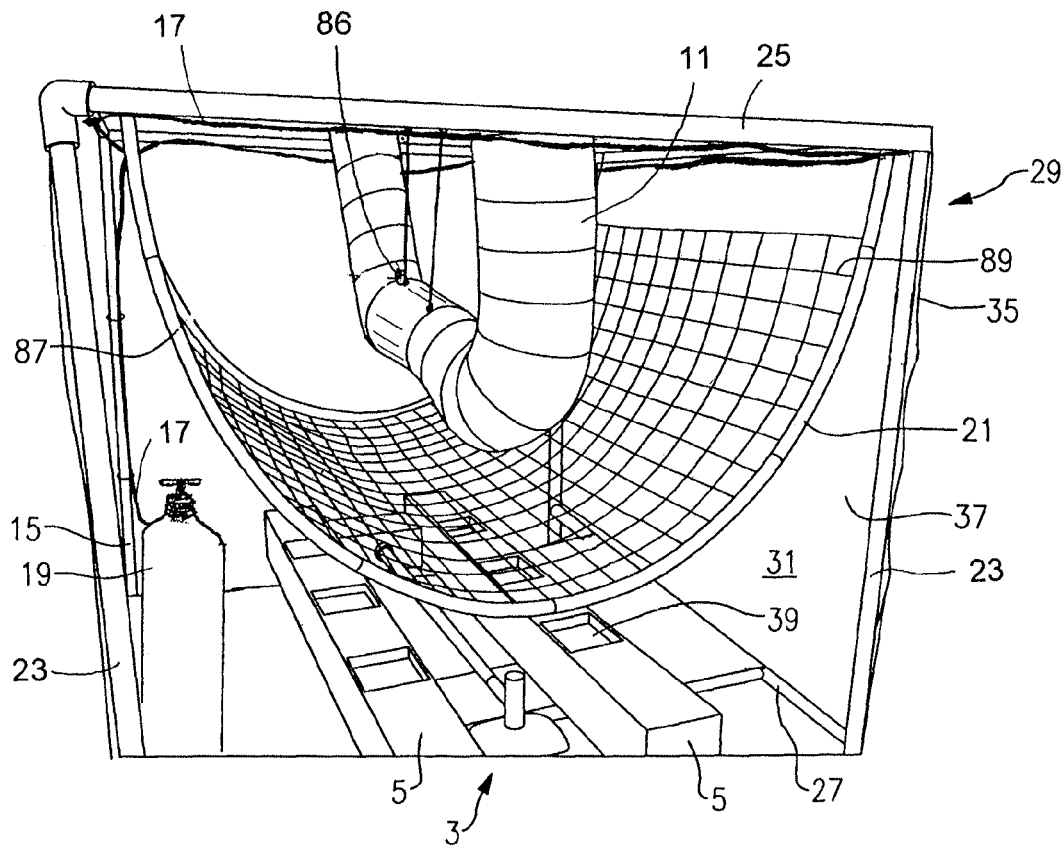
FIG. 2 is a pictorial side view of the integrated trellis machine with the integrated trellis.
Figure 3:
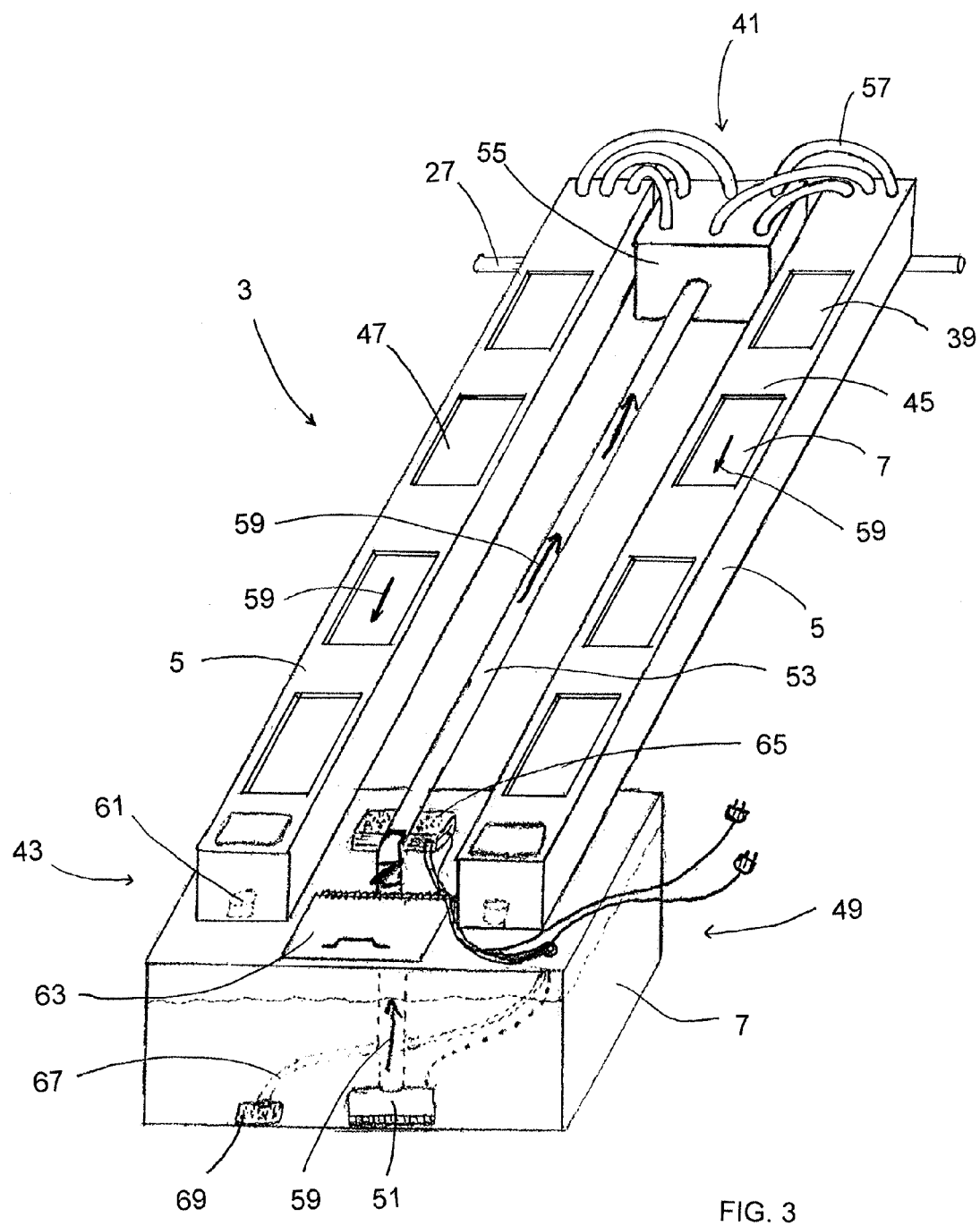
FIG. 3 is a pictorial diagram of a hydroponic nutrient delivery system of the according to the invention.

As illustrated, the embodiment of the trellis 21 shown in the FIGS. 1, 2 is formed so as to have a U-shaped cross section however in other embodiments, the trellis 21 has a circular, semi-circular, parabolic or polygonal cross section with the source of light 13 being located within an interior thereof. In each of the above embodiments, the trellis 21 extends along an axis and when viewed from the front as in FIG. 1, i.e. normal to the axis, the mesh barrier 89 extends straight between the two braces 87 thereby forming a straight line front profile (see FIG. 1). It is to be appreciated that the trellis 21 can be formed such that the surface forms a sphere, semisphere, parabolic or elliptic cone or other such three dimensional shape. For example, preferably three dimensional shapes of the trellis are shown diagrammatically in front and side views with the number of the figure illustrating the front view of the trellis being followed by "A" and the number of the figure illustrating the side view of the trellis 21 being followed by "B". The embodiments of the trellis 21, as shown in FIGS. 10A, 10B, 11A, 11B, 12A and 12B, have a slightly longer axial length than the cross sectional view thereof. It is to be recognized that the axial length can be at least approximately the same as the cross sectional length depending on the size of the vegetation growing system 1, i.e. the body frame 29 as seen in FIGS. 13A, 13B, 14A, 14B, 15A and 15B which show that the front and side views of the trellis 21 have substantially the same dimensions. Other factors which may influence the size and shape of the lattice 21 is the type of bulb used as the source of light 13. Some bulbs are elongate and cylindrical, these types of bulbs are most efficiently utilized in vegetation growing systems that are longer in length and include trellis' that extend along a horizontal axis. Whereas spherical type bulbs are most efficiently utilized in growing systems that have at least substantially the same axial and cross sectional lengths. It is to be appreciated that only the perimeter of the mesh barrier 89 is shown in 10A, 10B, 11A, 11B, 12A, 12B, 13A, 13B, 14A, 14B, 15A and 15B The braces 87 of the trellis 21 could be formed by shafts, rods, staffs, poles or other such members and can be either rigid or flexible and made from a variety of materials such as metal, plastic or wood. An important aspect of the trellis 21 is that it must retain its shape or form when vegetation growing within the growing area 31 comes into contact with the trellis 21. The trellis 21 must further be rigid enough to withstand any forces placed thereon by the vegetation as the vegetation grows. It is beneficial for a number of reasons that the trellis 21 be made with rigid or resilient braces 87. If rigid or resilient braces are used to make the trellis, it is possible that a flexible type mesh barrier could be connected to the braces to form a rigid or resilient trellis. For example, with rigid braces connected to the frame body, a flexible mesh barrier could be stretched between and secured to the two braces. Although the mesh barrier may be flexible, when stretched taunt and secured to rigid braces, the trellis formed in this manner would be sufficiently rigid or resilient and would be capable of withstanding any forces placed thereon by growing vegetation.

Further, a trellis formed with rigid braces would be easier to install in the vegetation growing system than a trellis formed with flexible braces. For example, to install a trellis having flexible braces a first end of the braces would need to be secured to the frame in a desired location. Subsequently, the braces would next have to be bent or manipulated while at the same time the second end of the braces would have to be secured to the frame body at the appropriate location. In contrast a trellis having rigid braces would be installed by simply securing the ends of the braces at the desired locations of the frame body without the need of bending or flexing the braces into the desired form.

As indicated above, the mesh barrier 89 can be either rigid or flexible and made from a number of materials, e.g. wire fencing, aluminum screening, fiberglass screening, netting, etc. An important aspect of the mesh barrier 89 is that it must allow a maximum amount of light to pass from the source of light to the growing rails 5 of the nutrient delivery system 3 in which the vegetation grows. In other words the mesh barrier 89 should be made with a loose weave such that light on one side of the mesh is not prevented from passing though to the other side of the mesh barrier 89. A loose weave is meant to indicate a relative large opening between adjacent strands, wires or filaments for example. The size of the weave can also be quantified by it's "count", which refers to the number of openings per unit of distance, such that a loose weave would relate to a low count. As the mesh barrier 89 will be located between the hydroponic lighting system 9 and the nutrient delivery system 3, the greater the opening or the lower the count of the mesh barrier 89, the greater the amount of light that passes through the mesh barrier 89 to the vegetation.

Although it is desirable to for the mesh barrier 89 to have a large amount of space between the woven strands, which form the mesh barrier, it is to be appreciated that the openings should not be so large as to allow the vegetation to pass through the mesh barrier 89 as the vegetation grows toward the source of light. It is preferable for the openings between two adjacent strands to be within a range of 1 inch to 4 inches or more preferably to be within the range of 2 inches to 3 inches.

The mesh barrier 89 functions to "shape" the foliage of the vegetation to match the physical characteristics of the source of light 13 thereby maximizing use of the light and improving its efficiency. The function of the mesh barrier 89 in the vegetation growing system 1 is described below with reference to FIGS. 6-9, which illustrate various stages of vegetation growth as viewed from a side of the vegetation growing system 1. For the sake of simplicity, the vegetation growing system 1 is diagrammatically shown and only includes the rails 5, the source of light 13 and hangers 79, the frame body 29 and the trellis 21. It is to be understood that the vegetation V, i.e. the shape and form of the vegetation V is for illustration purposes only and is meant to aid in describing the function some of the vegetation growing system elements in relation to the growth of the vegetation V. The illustrated vegetation is not meant to represent any specific variety of vegetation.

Figure 6:
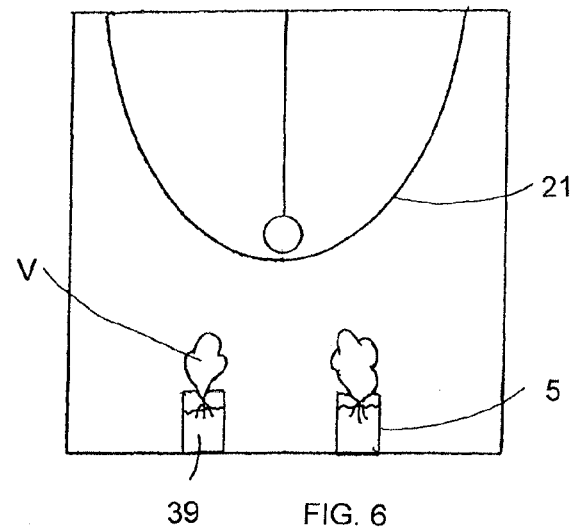
FIG. 6 is a diagrammatic view illustrating one stage of vegetation growth in the integrated trellis machine.

FIG. 6 shows an early developmental stage of the vegetation growing in the rails 5 of the nutrient delivery system 3. In this early stage of vegetation growth the root masses are supported within the flow 59 of nutrient solution 7 by a substrate. As such substrates are known in the art and for the sake of clarity, the substrate has not been shown in the illustrations. The source of light 13 is suspended by the hangers 79 in as low a position as possible so as to be closely adjacent to rails 5 as possible. It is to be recognized that at this early stage of vegetation growth, the trellis 21 need not be installed in the vegetation growing system 1. As such, the source of light 13 may be lowered so as to be even closer to the vegetation V than is shown in the figure. At this point in development, the vegetation V starts to grow at least somewhat in the direction of the source of light 13.

Figure 7:
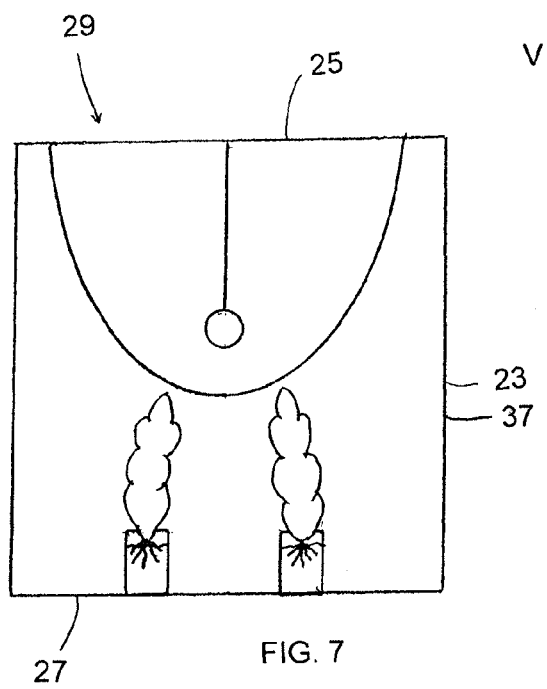
FIG. 7 is a diagrammatic view illustrating another stage of vegetation growth in the integrated trellis machine.

In a subsequent stage of vegetation growth, as illustrated in FIG. 7, the vegetation V has grown to a point at which it is closely adjacent the trellis 21 and is still growing somewhat directly towards the source of light 13. If the trellis 21 was not previously installed in the vegetation growing system 1, at or about this point in vegetation growth, the trellis 21 should be installed. As shown, the source of light 13 is raised up by adjustment of the hangers 79 such that the source of light 13 is spaced from the vegetation V by a desired distance. As discussed above it is desirable for the source of light 13 to be spaced from the vegetation V by an approximately uniform distance as the vegetation V grows.

Figure 8:
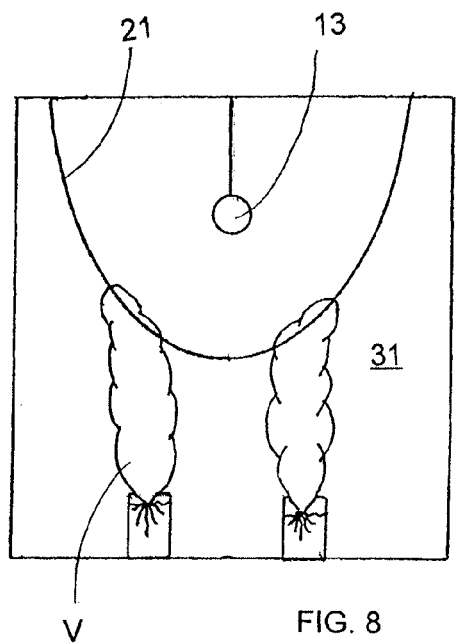
FIG. 8 is a diagrammatic view illustrating a further stage of vegetation growth in the integrated trellis machine.

A further stage of vegetation growth is illustrated in FIG. 8 which shows the vegetation communicating with the trellis 21. As the vegetation V grows and communicates with the trellis 21, the trellis 21 will interfere with the growth of the vegetation V in the direction towards the source of light 13. In other words, the trellis 21 functions to redirect the growth of the vegetation V, thereby forming or shaping the vegetation V as it grows up around the outside of the trellis 21. The space between the woven strands of the mesh of the trellis 21 should be sized to allow the passage of light however the spaces should not be so large as to allow the vegetation V freely pass through the mesh barrier 89 as the vegetation V grows toward the source of light 13. Although some foliage of the vegetation V may pass through the mesh 89 it is noted that the vegetation V generally conforms to the shape and form of the trellis 21. It is to be recognized that the source of light 13 is raised further upward thereby maintaining the distance between the vegetation V and the source of light 13.

Figure 9:
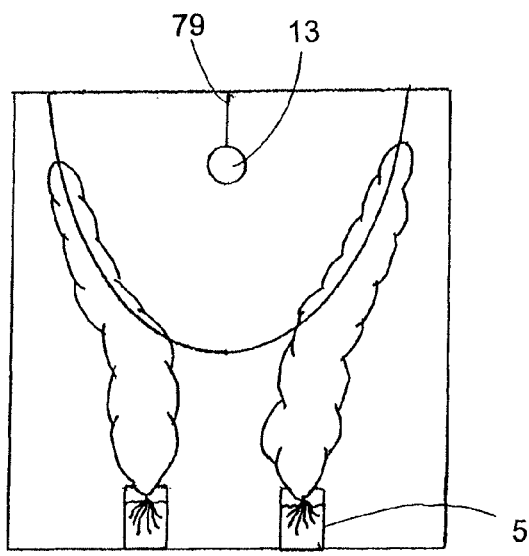
FIG. 9 is a diagrammatic view illustrating yet a further stage of vegetation growth in the integrated trellis machine.
Figure 13A:
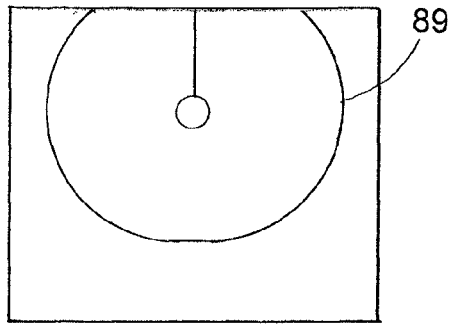
FIGS. 13A, 13B are diagrammatic views of yet another embodiment of the trellis in the integrated trellis machine.
Figure 13B:
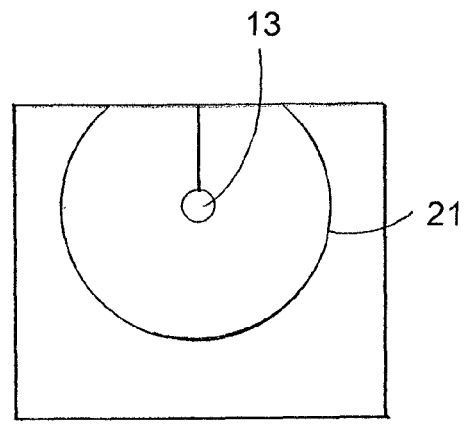
Figure 14A:
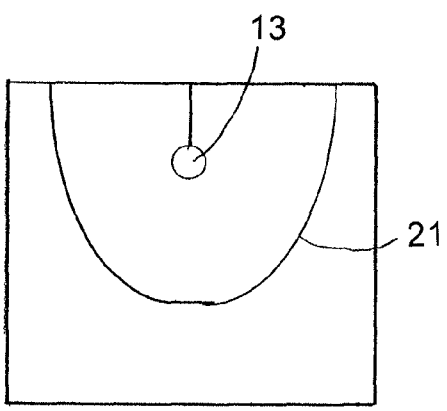
FIGS. 14A, 14B are diagrammatic views of yet a further embodiment of the trellis in the integrated trellis machine.
Figure 14B:
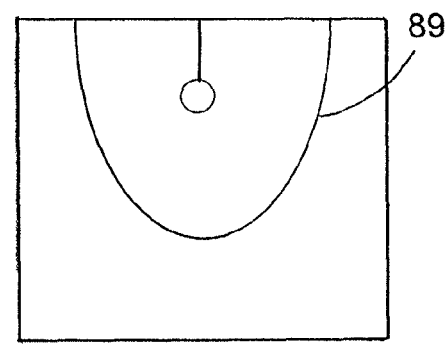
Figure 15A:
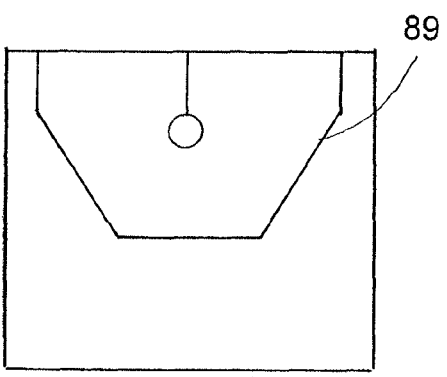
FIGS. 15A, 15B are diagrammatic views of still another embodiment of the trellis in the integrated trellis machine.
Figure 15B:
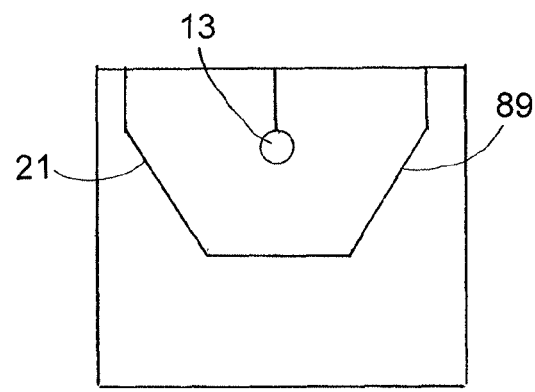

In the final illustrated stage of vegetation growth, as shown in FIG. 9, the vegetation V is shown to have grown in the shape and form of the trellis 21. That is the vegetation V has generally grown along an outside of the mesh 89 and redirected from growing toward the source of light 13. It is to be further recognized that the hangers 79 have been adjusted such that the source of light 13 is closely adjacent the top of the frame body 29. As the vegetation V grows and is shaped and formed by the trellis 21 around the source of light 13, the vegetation V is efficiently bathed in the light during all phases of operations when the light is on. This maximizes efficiency of the vegetation growing system as well as the production of vegetation.

FIGS. 16-20 illustrate another embodiment of the integrated trellis machine. This integrated trellis machine generally includes a hydroponic nutrient delivery system 103 which employs the use of a DWC system for supplying the vegetation V with the nutrients necessary for growth. The framework 129, the trellis 121 and the hydroponic lighting system 109 are supported atop the nutrient delivery system 103 in the manner described below. In distinction from the embodiment described above the framework 129 and the trellis 121 are spherically shaped with the trellis 121 being supported within the framework 129. Further the hydroponic lighting system 109 is vertically supported within the integrated trellis machine.

Figure 16:
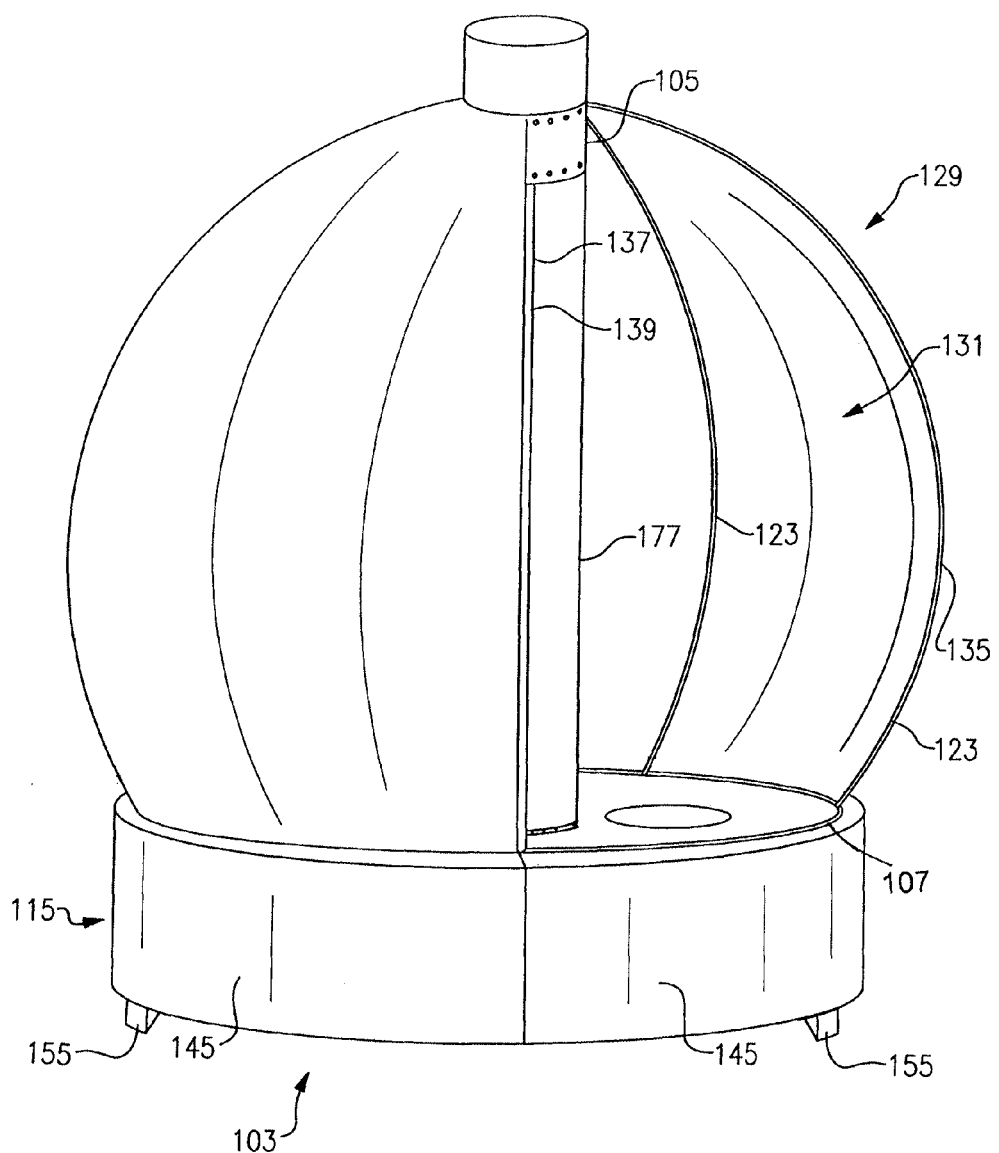
FIG. 16 is a pictorial diagram of the framework and shroud of a further embodiment of the hydroponic nutrient delivery system of the according to the invention.

Turning now to FIG. 16, the framework 129 is formed by arcuate shafts 123 that are vertically aligned, with the tops of the shafts 123 being fixed to about the circumference of a cylindrical upper mounting collar 105. The bottoms of the shafts 123, on the other hand, are fixed within a seal ring 107 located atop the nutrient delivery system 103. The framework 129 is essentially formed by two hemispherical half frames. Since the half frames only comprise vertically aligned shafts 123, the half frames can either be united to from a sphere or separated to form two hemispheres. As seen in the FIG. 20, the diameter of the seal ring 107 is greater than the diameter of the mounting collar 105. As will be described in more detail below, the diameter of the seal ring 107 is greater than the radial distance from the central vertical axis CA to the outside of the plant pockets 111 that are located within the nutrient delivery system 103. Due to the difference in the diameters, the nutrient delivery system 103 sections off a lower portion of the spherically shaped framework 129.

The spherical framework 129 supports a shroud material 135 which encloses the growing area 131 and insulates it from the environment in which the vegetation growing system is located. The shroud material 135 is secured to the mounting collar 105 and supported by the framework 129 so as to form a spherical outer shell. Like the embodiment described above, the shroud material 135 is a heavy canvas that is lined with a reflective Mylar finish that reflects the light emitted by the lighting system 109. It is preferable for the shroud material 135 to have a slit 137 such that the frame hemispheres may be "opened" to allow access to the interior of the integrated trellis machine, i.e. growing area 131 without the need of removing the shroud material 135 from the frame hemispheres. When the frame hemispheres are "closed", generally forming a sphere, the sides of the slit 137 or the sphere mating surfaces can be joined by means of a fastener 139, i.e. zipper, hook and loop fasteners or buttons, etc. This ensures that the growing area 131 will be closed to the outside environment thereby preventing the loss of light or temperature.

Figure 17:
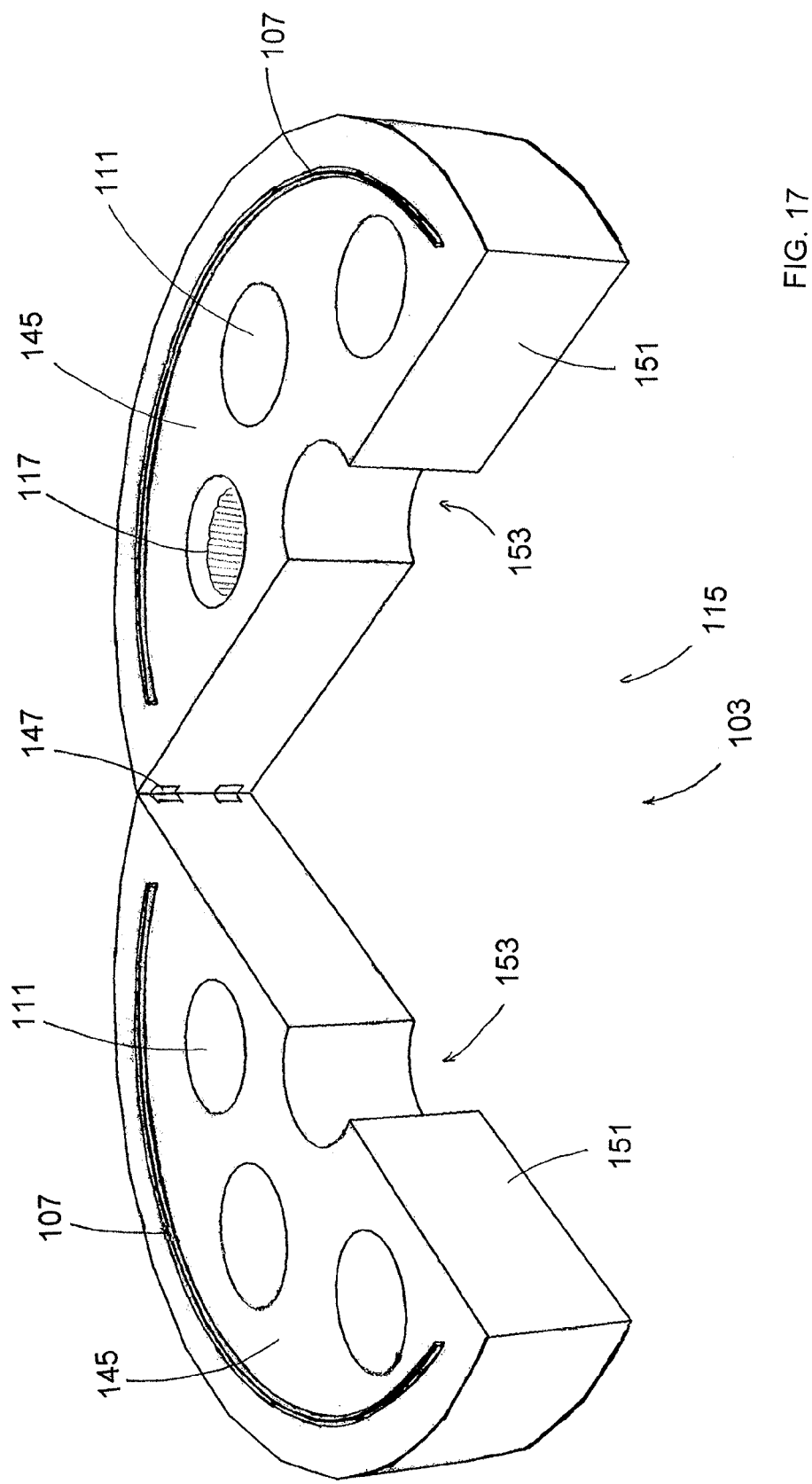
FIG. 17 is a pictorial diagram of the nutrient delivery system of the further embodiment of the hydroponic nutrient delivery system of the according to the invention.
Figure 18:
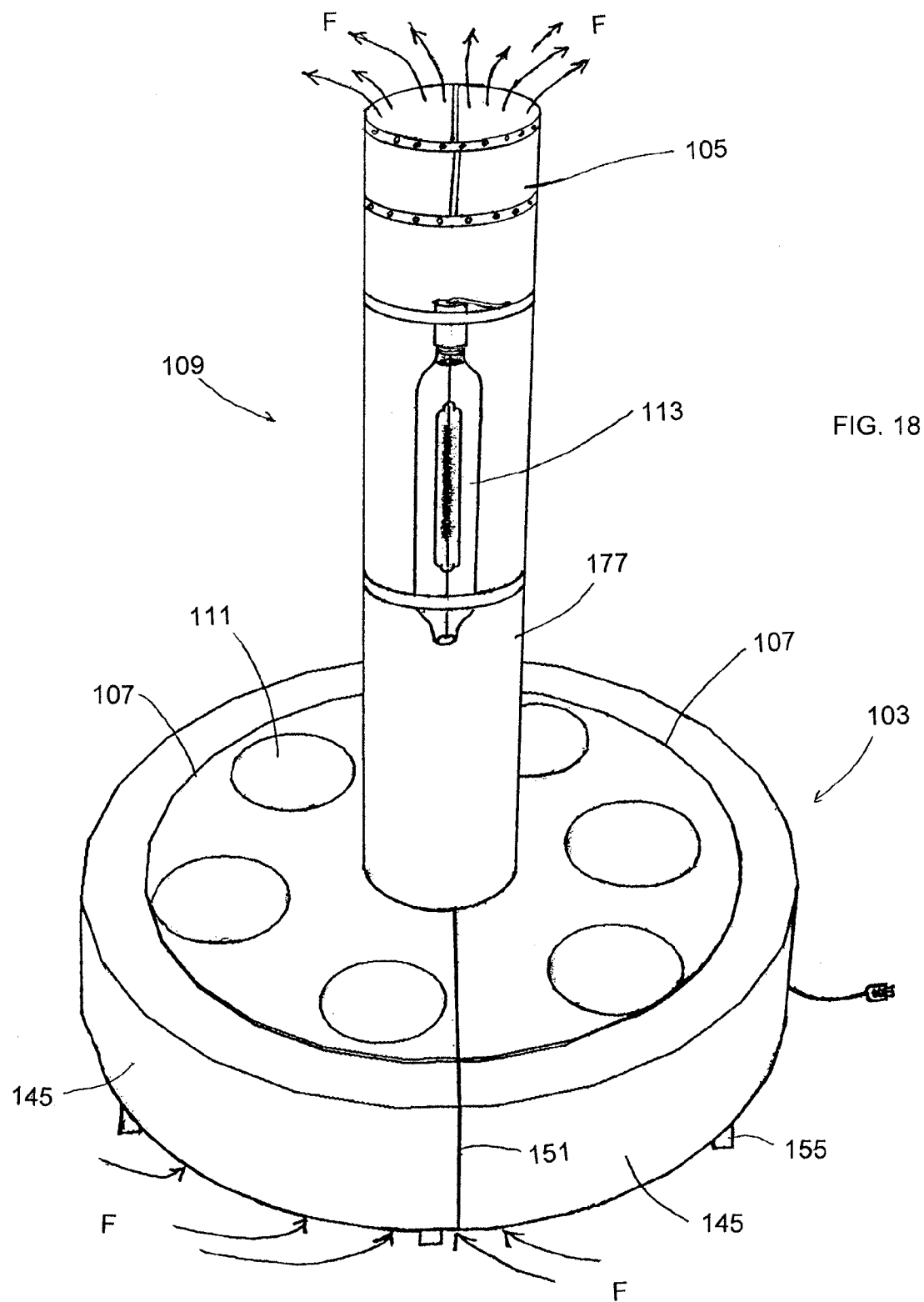
FIG. 18 is a pictorial diagram of the lighting system and nutrient delivery system of the further embodiment of the hydroponic nutrient delivery system of the according to the invention.
Figure 19:
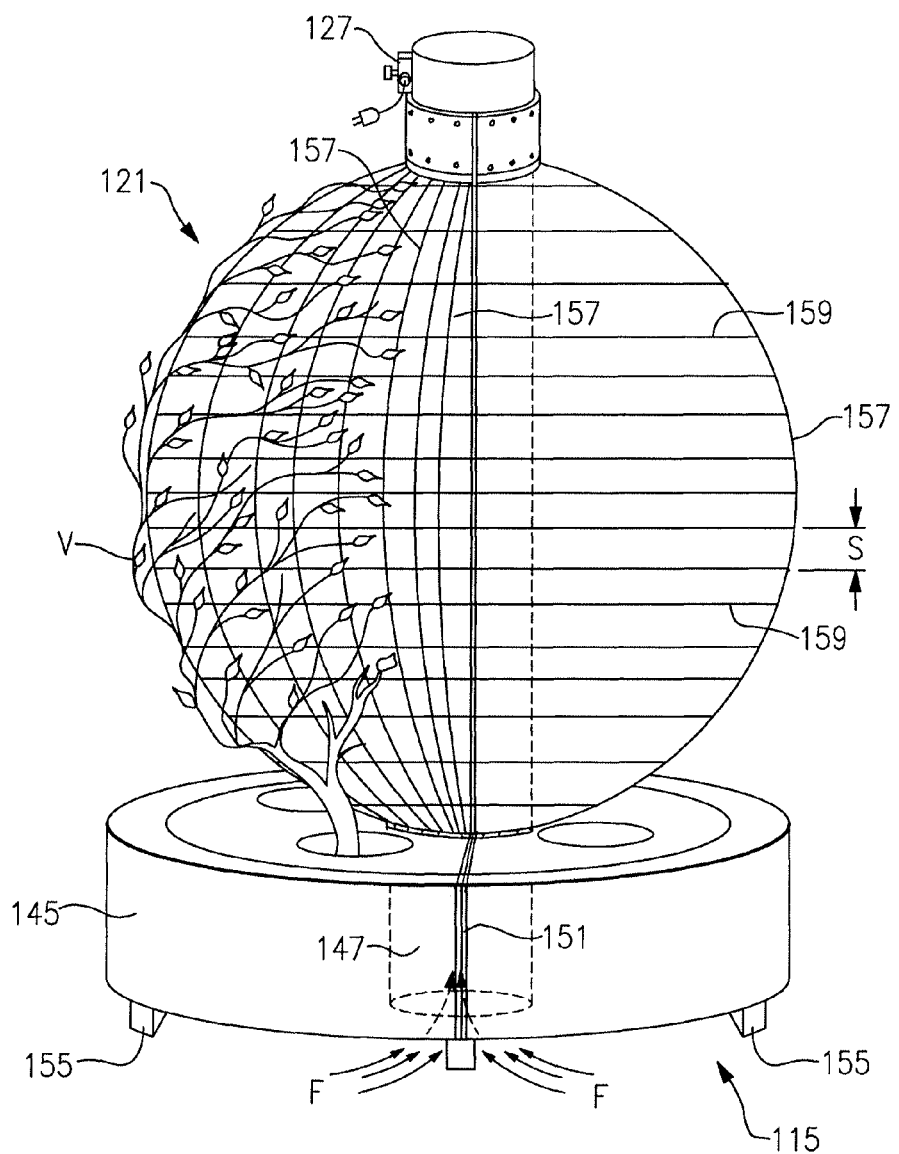
FIG. 19 is a pictorial diagram of the trellis and nutrient delivery system of the further embodiment of the hydroponic nutrient delivery system of the according to the invention.

The nutrient delivery system 103 includes a nutrient reservoir 115 which comprises two nutrient tanks 145. The two nutrient tanks 145 each form a semicircle as shown in FIG. 17. The two nutrient tanks 145 are connected by a hinge 147 so they can be "opened" and "closed", i.e. they can be pivoted to form either the two semicircles or they can be adjusted to form a circle (see FIG. 18), as viewed from a point along the central vertical axis CA. In the closed position, the diametrical surfaces 151 of the two semicircular nutrient tanks 145 abut one another and in the open position, the diametrical surfaces 151 are spaced from one another. Each of the nutrient tanks 145 has a recessed area 153 that is located centrally along its diametrical surface 151 and when the nutrient tanks 145 are closed, the recessed areas 153 form a central cylindrical passage 147 that extends along the central vertical axis CA of the integrated trellis machine. Each nutrient tank 145 comprises two, three or more plant pockets 111 in which the vegetation is supported and grows. FIG. 18 illustrates nutrient tanks 145 having three plant pockets 111. Located radially further from the recessed area 163, the upper surface of the nutrient tanks 145 each comprise the above mentioned seal ring 107. The seal rings 107 receive the bottom of the framework 129 and/or the shroud material 135. The seal rings 107 on the nutrient tanks 145 and the upper mounting collar 105 allow the shroud material 135 to remain secured in a semi-spherical shape while enabling access to the growing area 131. The nutrient tanks 145 have feet 155 which lift the base of the nutrient reservoir 115 from the surface on which it stands thereby enabling air to enter into the central passage 131 as will be explained further below.

The plant pockets 111 accept growing media cubes, such as rockwool cubes or the like with plant sets located therein. A mesh basket 117 sits down inside the plant pockets 111 such that roots of the plants communicate with nutrients in the nutrient tanks 145 of the nutrient reservoir 115. This nutrient reservoir 115 employs the use of the DWC system for the main vegetative cycle. In other words, seeds, seedlings and cloned cuttings of plants can be started when small with an ebb and flow conversion kit that sits atop the nutrient reservoir 115 and is more suitable for new starts. Once the roots of the new starts fill the growing media cube, the sets are placed into the mesh baskets 117 directly in the plant pockets 111 of the nutrient reservoir 115.

The lighting system 109 of this embodiment comprises a source of light 113 that is housed within a bulb casing 177. The bulb casing 177 is a cylindrical housing that is supported along the central vertical axis CA of the integrated trellis machine. Both of the top and bottom ends 123, 125 of the bulb casing 177 are open to the environment thereby facilitating cooling of the source of light 113. As illustrated in FIG. 18 when the source of light 113 is on, the air that is located within the bulb casing 177 heats up, flows upwards and exits the bulb casing 177 from the top end 123. At the same time, cool air is drawn into the bulb casing 177 from the bottom end 125 and begins to rise as it heats. With the source of light 113 supported within a vertically aligned bulb casing 177, when energized, the source of light 113 is automatically cooled, via a constant flow of air, by convective heat transfer. The flow of air is represented in the illustrations by arrows F. The source of light 113 can also be cooled with a constant flow of air that is either blown or drawn through the bulb casing 177 by means of a fan or a blower 127 for example. Although the use of a fan or blower 127 may be beneficial in directing a flow of heated air in a desired manner, i.e. to heat an adjacent room, this method of cooling the source of light requires power and reduces the overall energy efficiency of the growing system.

The upper mounting collar 105 encircles and is supported adjacent the top 123 of the bulb casing 177 thereby sealing the top of the integrated trellis machine while the bottom 125 of the bulb casing 177 is encircled and supported within the central passage 153 of the nutrient tanks 145. In this manner the growing area 131 is sealed from the outside environment.

The trellis 121 is a two part spherical trellis comprising two hemispheres that are formed by arcuate vertical spines 157 and horizontal ribs 159. The top and the bottom ends of the spines 157 are fixed about the circumference of the upper and a lower mounting collar 105. Between the tops and the bottoms, the spines 157 are bowed away from the central vertical axis CA thereby providing the trellis 121 with its spherical shape. The ribs 159 are supported by the spines 157 and pass horizontally about the circumference of the spherical trellis 121. The spines 157 and the ribs 159 are arranged in similar manner to the longitude and latitude lines of the Earth. The spines 157 and the ribs 159 are preferably rigid so as to hold their arcuate shape and can be formed respectively from aluminum and nylon for example.

The ribs 159 are horizontally spaced from each other along the vertical axis CA such that the vertical spacing S between adjacent ribs 159 is fairly consistent between the upper and lower ends of the spines 157. Given the considerations as discussed above with regard to the spacing between adjacent strands, it is preferable for the spacing S between two adjacent ribs 159 to be within a range of 2 inches to 5 inches or more preferably to be within the range of 3 inches to 4 inches. In contrast the tops and bottoms of the spines 157 are fixed to the cylindrical mounting collars 105 which have radii that is much smaller than the radius of the rib 159 that is centrally located between the top and the bottom of the trellis 121. Because of this the horizontal spacing between adjacent spines 157 changes depending on its location along the vertical axis CA. In other words, the horizontal spacing between the spines 157 is smaller at the top and bottom of the trellis 121 than the spacing centrally therebetween.

The hemispheres of the trellis 121, like the framework 129, are supported by the nutrient tanks 145 so as to "open" and "close", i.e. the can be pivoted to an open position to form the two trellis hemispheres or they can be adjusted to a closed position thus forming the spherical trellis 121. The open position of these elements enables access to the growing area 131 thereby allowing training of the vegetation to the inner trellis 121 as well as inspection, pruning, etc. as needed.

Figure 20:
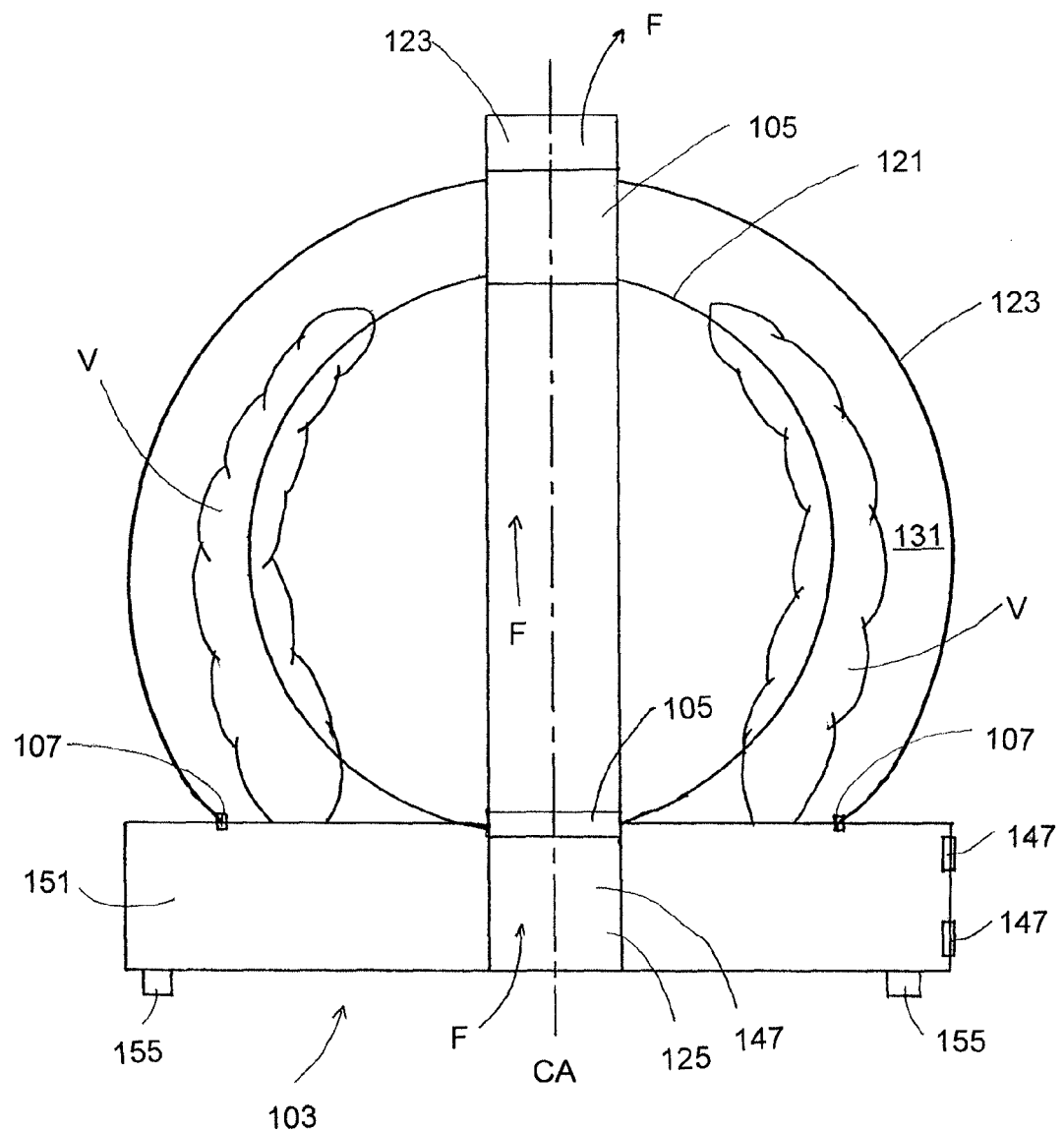
FIG. 20 is a diagrammatic cross section of the further embodiment of the hydroponic nutrient delivery system of the according to the invention.

FIG. 20 shows a cross section of this embodiment of the vegetation growing system. In this illustration, the arrangement of the framework 129 and shroud 135, trellis 121, lighting system 109 and the nutrient delivery system 103 are diagrammatically shown in relation to each other together with the vegetation V which is shown in an advanced stage of growth. The vegetation V in this embodiment is trained up and around the trellis 121 to conform to the optimal output of the high intensity light source 113 which is located within the bulb casing 177.

These embodiments of the integrated trellis machine maximize the production of vegetation growth with a minimum amount of space and consumption of energy.

With regard to the above description and appended drawings, it is to be appreciated that only the terms "consisting of" and "consisting only of" are to be construed in the limitative sense while of all other terms are to be construed as being open-ended and given the broadest possible meaning.

Since certain changes may be made in the above described improved integrated trellis machine and vegetation growing system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. An integrated trellis machine for hydroponic growing systems, the trellis machine comprising:
    a housing comprising a framework and a shroud being supported over the framework and defining a growing area located within an interior of the trellis machine;
    a hydroponic nutrient delivery system supplying nutrients to vegetation as the vegetation grows within the growing area;
    a lighting system supplying light to the vegetation as the vegetation grows, the lighting system comprising a source of light which is housed within a light casing which is supported within the growing area, the light casing forms a conduit having ends which are open to an exterior of the growing area; and
    a trellis being supported by the framework and located within the growing area between the nutrient delivery system and the source of light such that the trellis forms a barrier between the vegetation and the source of light, the trellis being shaped to redirect growth of the vegetation as the vegetation grows.

2. The integrated trellis machine according to claim 1, wherein the light casing is supported by an upper frame of the framework and hangs vertically above the nutrient delivery system, the trellis comprises a plurality of elongate braces having opposed ends, the opposed ends of the braces are secured to opposite sides of the upper frame and the light casing is supported between the opposite sides of the upper frame, the trellis has a mesh that is secured along the braces between the opposed ends such that the mesh passes between the nutrient delivery system and the source of light.

3. The integrated trellis machine according to claim 1, wherein the trellis comprises a plurality of elongate braces having first and second ends, the first end of the braces is secured adjacent a first side of an upper frame of the framework and the second end of the braces is secured adjacent a second side of the upper frame, the light casing is supported by a central portion of the upper frame of the framework and hangs vertically above the nutrient delivery system, the trellis has a mesh that is secured along the braces between the first and the second ends and the mesh extends from one of the braces to another one of the braces such that the mesh passes between the nutrient delivery system and the source of light.

4. The integrated trellis machine according to claim 1, wherein when viewed from a side of the integrated trellis machine, the light casing is supported by a central portion of an upper frame of the framework and hangs vertically above the nutrient delivery system, the trellis comprises a plurality of elongate braces having first and second ends, the first end of the braces is secured adjacent a first side of the upper frame and the second end of the braces is secured adjacent a second side of the upper frame, the braces define a side profile of the trellis which, together with the upper frame, surround the lighting system when viewed from the side of the integrated trellis machine.

5. The integrated trellis machine according to claim 1, wherein the light casing is supported by an upper frame of the framework, the trellis comprises elongate braces having opposed ends which are secured to the upper frame ends adjacent opposed sides of the framework when viewed from a side of the integrated trellis machine, the elongate braces defining a contoured side profile of the trellis when viewed from the side of the integrated trellis machine, the source of light being supported within an interior of the contoured side profile and the nutrient delivery system being located in an exterior of the contoured side profile when viewed from the side of the integrated trellis machine.

6. The integrated trellis machine according to claim 5, wherein, when viewed from the side of the integrated trellis machine, the contoured side profile of the trellis is arcuate.

7. The integrated trellis machine according to claim 5, wherein, when viewed from the side of the integrated trellis machine, the contoured side profile of the trellis is substantially U-shaped.

8. The integrated trellis machine according to claim 1, wherein the trellis is secured to an upper frame of the framework, when viewed from a first side of the integrated trellis machine, the trellis has a substantially U-shaped profile and, when viewed from a second side of the integrated trellis machine, the trellis has a substantially U-shaped profile, the first and the second sides of the integrated trellis machine are 90 degrees with respect to each other, and the light casing is supported by the upper frame of the framework and hangs vertically above the nutrient delivery system within an interior of the U-shaped profile of the trellis.

9. An integrated trellis machine for hydroponic growing systems, the trellis machine comprising:
    a housing comprising a framework and a shroud being supported over the framework and defining a growing area located within an interior of the trellis machine;
    a hydroponic nutrient delivery system supplying nutrients to vegetation as the vegetation grows within the growing area;

a lighting system supplying light to the vegetation as the vegetation grows, the lighting system comprising a source of light which is housed within a light casing which is supported within the growing area, the light casing forms a vertically aligned conduit and has an upper end and a lower end which are open to an exterior of the growing area; and a trellis being supported by the light casing and located within the growing area between the housing and the source of light such that the trellis forms a barrier between the vegetation and the source of light, the trellis being shaped to redirect growth of the vegetation as the vegetation grows.

10. The integrated trellis machine according to claim 9, wherein a top of the housing is supported by the upper end of the light casing and a bottom of the housing is supported by an upper surface of the nutrient delivery system adjacent an outer perimeter thereof, a top of the trellis is supported within the interior of the trellis machine adjacent the upper end of the light casing, a bottom of the trellis is supported by the lower end of light casing at the upper surface of the nutrient delivery system, the housing being semi-spherical and the trellis being substantially spherical, the trellis being located in the growing area within the housing, the trellis and the housing being aligned along a central axis and the nutrient delivery system having a central passage through which the light casing extends, and the central passage and the light casing are coaxial with the central axis.

11. The integrated trellis machine according to claim 10, wherein the light casing comprises a cylindrical mounting collar that is located at the upper end of the light casing, the mounting collar comprises upper and lower ends, the top of the housing is supported by the upper end of the mounting collar and the top of the trellis is supported by the lower end of the mounting collar, the upper surface of the nutrient delivery system comprises a seal ring which is located adjacent an outer perimeter thereof, the bottom of the housing is supported sealed, via the seal ring, to the upper surface of the nutrient delivery system.

12. The integrated trellis machine according to claim 10, wherein the nutrient delivery system comprises two nutrient tanks which are semicircular in shape when viewed from a point on the central axis, each of the nutrient tanks has a diametrical face and are pivotally coupled to each other by a hinge such that the nutrient tanks are pivotable between a closed position in which the diametrical faces of the nutrient tanks abut each other and an open position in which the diametrical faces of the nutrient tanks are at an angle with respect to each other, each of the diametrical faces comprises a recessed area which form the central passage when the nutrient tanks are in the closed position.

13. The integrated trellis machine according to claim 12, wherein the upper surface of the nutrient tanks each comprise an arcuate seal ring that is located radially within the outer perimeter thereof, each of the nutrient tanks includes a plurality of plant pocket apertures which receive and support vegetation as the vegetation grows within the integrated trellis machine, the plant pocket apertures are located radially between the seal ring and the recessed area of the respective nutrient tank.

14. The integrated trellis machine according to claim 13, wherein the housing and the trellis are each formed of two semi-spheres, the semi-spheres of each of the housing and the trellis are supported by the nutrient tanks such that the semi-spheres of the trellis and the housing form spheres when the nutrient tanks are in the closed position and are semi-spheres when the nutrient tanks are in the open position, to facilitate access to the vegetation as the vegetation grows.

* * * * *